July 30, 1968
E. GLOCK
3,394,630
APPARATUS AND METHOD FOR TESTING THE QUALITY
OF PHOTOGRAPHIC OBJECTIVES
Filed April 30, 1962
2 Sheets-Sheet 1
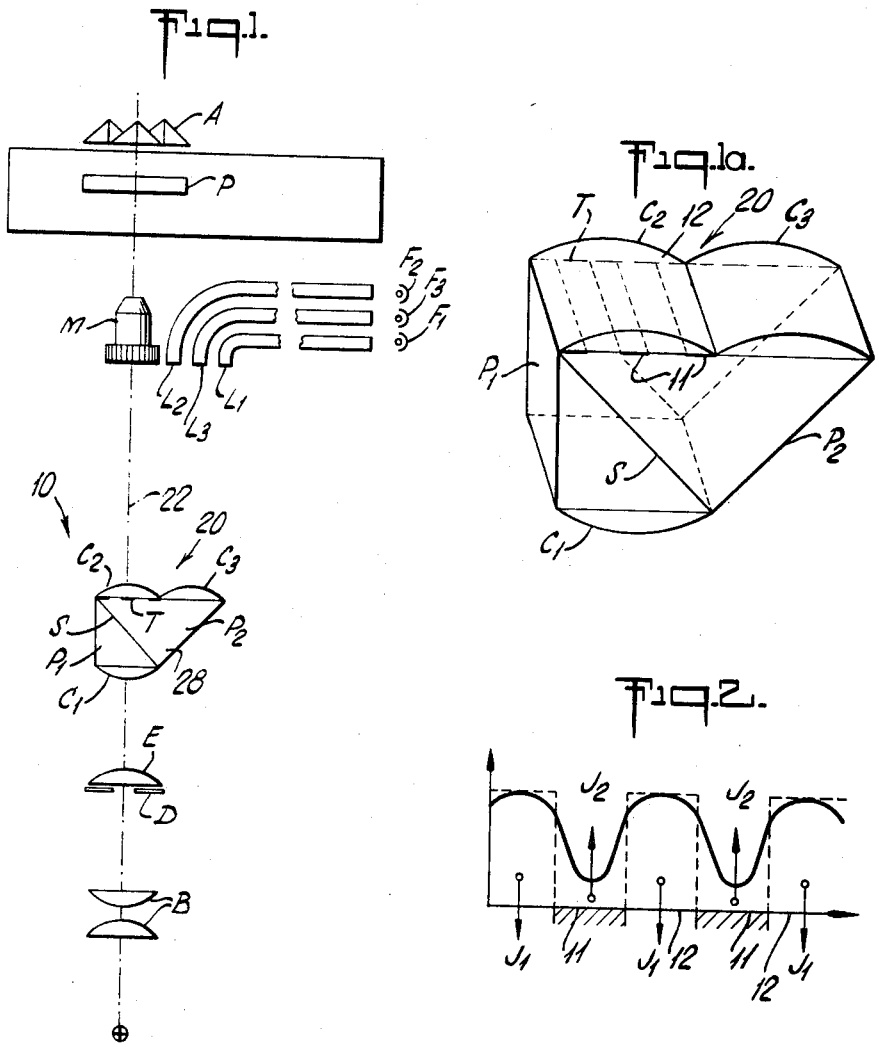
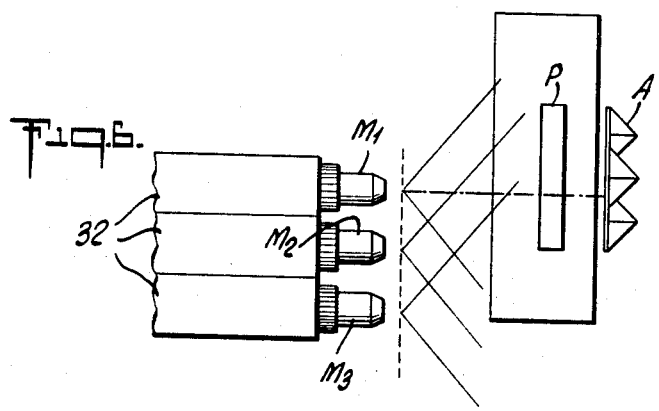
INVENTOR
ERNST GLOCK
BY
Nolte & Nolte
ATTORNEYS July 30, 1968     E. GLOCK     3,394,630
APPARATUS AND METHOD FOR TESTING THE QUALITY
OF PHOTOGRAPHIC OBJECTIVES
Filed April 30, 1962     2 Sheets-Sheet 2
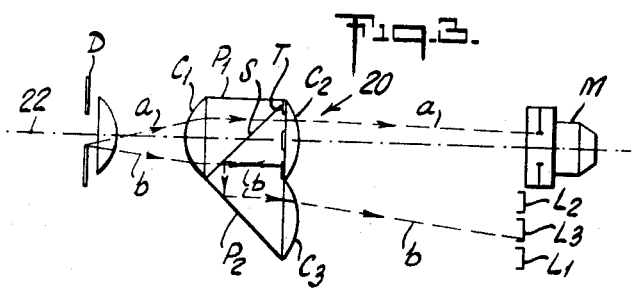
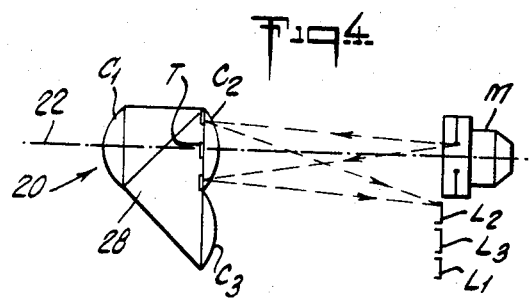
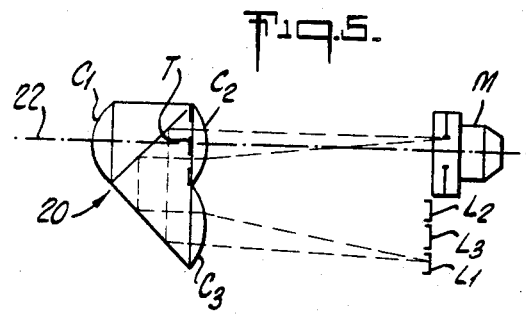
INVENTOR
ERNST GLOCK
BY
Nolte & Nolte
ATTORNEYS

United States Patent Office 3,394,630
Patented July 30, 1968

3,394,630
APPARATUS AND METHOD FOR TESTING THE QUALITY OF PHOTOGRAPHIC OBJECTIVES
Ernst Glock, 31 Kunigundenstrasse, Munich, Germany
Filed Apr. 30, 1962, Ser. No. 191,135
Claims priority, application Germany, Mar. 30, 1962, G 34,611
5 Claims. (Cl. 88—56)

The present invention relates to lens testers and more particularly to a method and apparatus for testing the quality of photographic objectives.

With conventional lens testers embodying autocollimation and photo-electric devices, a test object in the form of a patterned graduated plate or reticle is projected by a micro-objective into the focal plane of an objective to be tested. The image of the reticle serves now as a test pattern for the lens to be tested, which forms itself an image thereof at infinity. This latter image is projected or reflected by a retroreflector composed of corners of a cube back on to the test pattern and by the micro-objective back upon the test object. In this case the reflected light striking the translucent parts of the reticle is thrown on to a photo-electric cell by means of a semi-translucent mirror arranged in the path of rays.

With known testers of this kind, a black-and-white screen or grating is used as the test object. Because of this black-and-white screen only one photo-electric cell can be used, so that the exactitude in measurement is not satisfactory.

Other known lens testing arrangements in which autocollimation takes place in the convergent path of rays have the disadvantage that for each point in the image field to be tested the autocollimation mirror must be re-adjusted. Moreover, any incorrect adjustment of a mirror has the same effect as if there is a defect in the objective to be tested. Therefore these prior-art testing arrangements are not suitable for testing objectives in series, in which not only points near the axis of the image field, for example, but also any other points are to be tested for defects of image, without the incorrect adjustment of the testing apparatus influencing the measurement of the defects.

The present invention aims at providing a novel testing apparatus and method free from the foregoing drawbacks and with which defects in the objectives to be tested can be compared with predetermined tolerances.

Another object of the invention is to provide a space-saving arrangement, so that a plurality of testing units may be combined into one apparatus for testing different zones of the objective simultaneously.

A further object of the present invention resides in the provision of a novel objective tester enabling the light to be better utilized, the stray light being kept at a minimum, and enabling the exactitude of measurement to be increased.

The lens tester according to the invention is characterized by the feature that the opaque parts of the test object form mirror surfaces. This feature of the invention enables that part of the light reflected by the retroreflector and striking these mirror surfaces to be projected by optical means on to a photo-electric cell and measured by the latter. The light measured in this way represents a value for defects of image formation in the lens being tested. The retroreflected light passing through the translucent parts of the patterned test object and not reflected by the mirror surfaces thereof is measured with a further photo-electric cell to provide a light intensity measured which can be compared with the above-mentioned measurement of light intensity caused by defective image formation. The ratio between these two light intensities is thus determinable to indicate the magnitude of any defect of image formation in the test objective. This preferred measuring process according to the invention therefore enables a very exact determination of the defects of image formation in an objective.

In a preferred embodiment of the invention a source of light is projected into the pupil of a micro-objective by means of lenses cemented on to a cubic beam-splitter. A test object whose opaque parts are reflecting is positioned at the side of the cubic beam-splitter which is adjacent to the micro-objective and is slightly inclined to the optical axis of the system. The light passing from the micro-objective to the cubic beam-splitter and striking the reflecting parts of the test object or pattern is projected by a lens on to a first photo-electric cell. The light coming from the micro-objective and striking the translucent parts of the test object, on the contrary, is reflected by the cubic bear-splitter and is projected by a lens on to a second photo-electric cell.

The inventive apparatus has therein a reticle formed by transparent and reflecting areas. These may have any desired form and are preferably in the form of a grating. Owing to this expedient, the beam returned by the retroreflector admits not only a measurement of the defects in the original beam but also a direct measurement of the light scattered by the faulty performance of the lens to be tested. This light is directed to the photo-electric detector or cell by the reflectance of the opaque portions of the reticle. The part of the retroreflected light passing through the transparent portions of the reticle may be used for a measurement in a well known manner, after being deflected by a semi-transparent mirror arranged behind the reticle.

By combining a reticle, a semi-transparent mirror and some of the image-forming lenses into a cemented unit, a compact, reliable and easy-to-handle unit is provided.

A change in the measured intensities upon turning the objective around its optical axis furnishes information as to the centering and the position of the optical system in relation to the turning axis. Moreover, in the arrangement according to the invention, the difficulty is avoided of adjusting measuring devices to one another in two planes co-ordinated by the test piece. Furthermore, only the support of the objective needs to be precise, but not its adjustment parallel to the image plane.

Further objects of the invention will presently appear as the description proceeds in connection with the appended claims and the annexed drawings wherein:

FIGURE 1 is a schematical view of a preferred embodiment of a lens tester according to the present invention;

FIGURE 1a illustrates in a perspective view the cubic beam-splitter shown in FIGURE 1;

FIGURE 2 is a graph showing the distribution of light intensity of the reflected image of the test object across a grating serving as a reticle;

FIGURES 3–5 show details of the path of rays between the reticle and the photo-electric detectors or intermediate light guides, in the beams the intensity of which has to be measured; and FIGURE 6 is a schematical partial view of a tester equipped with several measuring devices in accordance with the present invention, for simultaneous testing of three points in the field of view of a lens.

Referring now to the drawings, wherein like reference numerals designate like parts, the preferred embodiment illustrated in FIGURE 1 comprises a lens tester 10, shown with a diaphragm D illuminated by a bulb L and equipped with an illuminating lens or condenser B, which forms an image of the lamp L in the diaphragm D. A field lens E is disposed between diaphragm D and a collimator lens $C_1$ and forms an image of the plane of condenser B in the end plane between the collimator lenses $C_1$ and $C_2$ bulb L.

The illuminating lens B is projected by the field lens E into collimator lens $C_1$. Lens $C_1$ and a further collimator lens $C_2$ are cemented on to a cubic beam-splitter 20 formed by two prisms $P_1$ and $P_2$. Field lens E forms an image of condenser B in or approximately in lenses $C_1$ and $C_2$, forming together a condenser. The slanted interfaces between prisms $P_1$ and $P_2$ is silvered to provide a semi-translucent boundary layer. A reflective test object or reticle T is applied to the surface of lens $C_2$ contacting splitter 20, thus positioning reticle T between lens $C_2$ and splitter 20.

Reticle T is in the form of a graduated plate having ruled opaque strips 11 delimiting translucent plate regions 12 and arranged to provide a rectangular distribution pattern of intensity. In accordance with the present invention, strips 11 of test object or reticle T are provided with mirroring surfaces facing an objective or lens P to be tested, so as to reflect light impinging on the mirroring surfaces for a purpose as will be explained in detail. Such mirrors reflect to both sides. It should be noted that in FIGS. 1 and 6, the lens P to be tested has been shown, for the sake of an example, as a simple lens.

One of several possible ways to produce the reticle is vacuum deposition of metal on the glass surface before cementing, according to well known procedures.

With continuing reference to FIGURE 3, a lens C is cemented on to prism $P_2$. Beam-splitter 20 is formed and disposed in such a way that it deflects the path of rays between boundary layer S and lens $C_3$ through an angle of 90°. Prism $P_2$ is shaped so that it is slightly unsymmetrical and has its base facing and adjacent to a micro-objective M. Objective P is disposed between micro-objective M and retroreflector A in such a way that the image of the reticle formed by M lies in the focal plane of P, which forms a further image thereof at infinity (this acting as a collimator for the test beam). The plate A is a retroreflector consisting of one or more cube corners which return any beam of parallel rays into itself. With these rays, retroreflected seemingly from infinity, the objective P forms one more image in its focal plane coinciding with the above-mentioned image from the micro-objective but with inversed direction of the light. The base of prism $P_2$ is slightly inclined relative to the lens tester optical axis indicated at 22.

Bulb L, lens B, lens $C_1$, splitter 20 (prisms $P_1$, $P_2$), lens $C_2$, micro-objective M, objective P to be tested, and retroreflector A are all arranged in a row, in the order named, along optical axis 22, the focal distances of the lenses and the distances along the axis being chosen such that the condenser B forms an image of lamp L in diaphragm D, the field lens E forms an image of condenser B in the midplane of lenses $C_1$ and $C_2$, and lenses $C_1$ and $C_2$ together form an image of diaphragm D in the micro-objective M. Lens $C_2$ and $C_3$ are cemented or otherwise fixed to the base of prism $P_2$ in side-by-side relationship with lens $C_2$ being disposed along optical axis 22 between beam-splitter 20 and micro-objective M. Lens $C_3$ is laterally offset from optical axis 22 and faces entrances to three light conductors $L_1$, $L_2$ and $L_3$. Conductors $L_1$, $L_2$ and $L_3$ are positioned in close proximity to micro-objective M. Disposed at the exits of conductors $L_1$, $L_2$ and $L_3$ are photo-electric cells $F_1$, $F_2$, and $F_3$ respectively. Objective P is arranged between the micro-objective M and the autocollimator plate A as previously described.

FIG. 1a shows in a perspective view how the prisms $P_1$, $P_2$ and the lenses $C_1$, $C_2$, $C_3$ are cemented to form beam-splitter 20, and where the interface S and the reticle T lies. The lens P to be tested forms an image of its focal plane at infinity wherefrom the light is returned by the autocollimation plate A, as has been explained hereinabove.

The principle of the measuring process to be carried out with the lens tester according to the embodiment of FIGURE 1 can be seen from the fact that the light passing through diaphragm D reaches retroreflector A through micro-objective M and objective P. From retroreflector A this light is reflected back to objective P and micro-objective M. In this case, the optical arrangement is chosen in such a way that all the light passing through objective P is reflected back to the translucent part 12 of test object or reticle T if objective P has no defect of image. This light is then projected by lens $C_3$ to light-conductor $L_1$. If, however, objective P has defects of image, part of the reflected light is also incident upon the mirroring parts or strips 11 of the test object T. This part of the reflected light incident on the mirroring parts of test object T is projected by lens $C_2$ to light-conductor $L_2$.

The ratio or some other combination of the light intensities measured at the co-ordinated photo-electric cells $F_1$ and $F_2$ is then a measure of the magnitude of a defect of image in objective P. The light coming from the diaphragm D and leaving cubic beam-splitter 20 through lens $C_3$ is projected on to the light-conductor $L_3$. The intensity of light measured at the photo-electric cell $F_3$ may be used for regulating the brightness of the lamp L.

A graph of the intensity distribution over the reticle T is shown in FIG. 2 for a special case adapted further to clarify the invention. The abscissa is to be understood as a line across alternating transparent strips 12 and reflecting strips 11, forming the reticle. The ordinate of the graph is proportional to the light intensity. The broken line forming a square-wave curve represents the light as it comes from the condenser (beam-splitter 20) and goes to the micro-objective M and the lens P. The solid line shows how this square-wave distribution may be deformed after passing twice the lens P under test.

The amounts of light designated $J_1$ incident from the micro-objective M on the transparent parts 12 of the reticle pass through, as indicated by the arrows; the amounts of light $J_2$ incident on the reflecting parts 11, in turn, are thrown in the opposite direction, as indicated by the arrows. From here the light is going different paths, as will be described in more detail with reference to FIGS. 3, 4 and 5.

With reference now to FIGURES 3–5 the path of rays within the cubic beam-splitter 20 (i.e. that of the light reflected at the cubic beam-splitter) will now be described in greater detail.

As shown in FIGURE 3, the light leaving diaphragm D is divided in cubic beam-splitter 20 into two beams $a$ and $b$. Beam $a$ corresponds in its distribution of intensity to the test pattern given by the test object or reticle T. After reflection at retroreflector A, this light is again reflected on to the test object T, and is there projected to the light-conductor $L_1$ or $L_2$ in a manner which will be presently described in detail in relation to FIGURES 4 and 5. Beam $b$ is projected on to the light-conductor $L_3$, and thus serves, in the manner described, for regulating the brightness of lamp L.

FIG. 3 shows how beam or ray $b$ is reflected by strips 11 of the reticle T, then deflected by the interface S and totally reflected by the opposite cathetus of prisms $P_2$. This light passes lens $C_3$ cemented to one half of the hypotenuse. Lens $C_3$, together with $C_1$, forms an image of diaphragm D on one of the intermediate light guides near the micro-objective M, say on $L_3$. This beam of light may be used to monitor the brightness of the lamp L. Conversely, beam or ray $a$ incident on transparent strips 12 is allowed to pass to the micro-objective M.

If the objective P has any defects of image, according to the foregoing arrangement, part of the light leaving micro-objective M to the left in the drawing is reflected to the mirroring strip faces 11 of test object T.

As shown in FIGURE 4, this part of the light which is incident upon the mirroring is projected, by means of lens $C_2$ to light-conductor $L_2$ due to the slight inclination of the base of the prism $P_2$ relative to the optical axis 22 of the lens tester. That part of the light, however, that falls upon the translucent regions or faces of test object T is split in cubic beam-splitter 20, in the manner shown in FIGURE 4, and is projected by lens $C_3$ on to light-conductor $L_1$. This light is totally reflected in the prism $P_2$, and is directed slightly downwardly to the light-conductor $L_1$, because of the somewhat unsymmetrical shape of the prism $P_2$. The inclination of the base of the prism $P_2$ to the optical axis of the system therefore has the advantageous result that the general arrangement can be made relatively small.

To this end, it is apparent from the drawings, that the base of prism $P_2$ extends transversely of the optical axis 22 at an angle which is slightly less than 90° as previously mentioned. Prism $P_2$ is provided with the approximate shape of an isosceles triangle with an apex 28 laterally offset from the optical axis 22, adjacent to lens $C_1$ and facing towards lens E.

FIG. 4 shows the beam containing the amount of light designated $J_2$ (see FIG. 2). This light, originating from the transparent parts 12 of the reticle T, is spilled by the defective performance of the lens P to be tested over the reflecting parts 11 of the reticle. This light serves to form an image of the pupil of the micro-objective M at the end of light guide $L_2$. If the lens to be tested were an ideal one, no light would appear at $L_2$.

FIG. 5, finally, shows the light beam containing the amount designated $J_1$. This is the light coming from and returning to the transparent strips 12. It is deflected by the interface S and the opposite cathetus of prism $P_2$ and forms an image of the pupil of the micro-objective M on intermediate light guide $L_1$.

The separation of the three light spots on guides $L_1$–$L_3$ is effected by an angle of $45°+\alpha$ at the corner of prism $P_2$ next to lens $C_2$, and of an angle of $90°+\beta$ at the corner of prism $P_2$ next to lens $C_2$, $\alpha$ and $\beta$ standing for small angles of a few degrees. The exact amount of the deviation $\alpha$ and $\beta$ from the 45° or 90° angle depends on the dimensions of the apparatus.

The number of merit for the image-forming qualities of a lens to be tested in one point of its field of view may be obtained by any combination of the signals obtained at $L_1$ and $L_2$. It is especially the quotient of the amounts of light, measured by $L_1$ or $L_2$, or its logarithm, which are suitable for this purpose.

Two lenses to be tested may give the same result in the center of the focal plane but may differ considerably for off-axis points. A test to be practicable for large numbers of lenses or objectives must, therefore, admit of a simultaneous examination of several points of the field of view.

The purpose of light-conductors $L_1$, $L_2$ and $L_3$, which may contain deviating prisms, is to transmit separate beams of light to be measured to photoelectric cells $F_1$, $F_2$ and $F_3$ respectively so that the cells can be arranged outside the optical paths of the rays.

In view of the foregoing description of the embodiment illustrated in FIGURE 1, it is apparent that an improved efficiency of light is obtained by employment of field lens E between diaphragm D and lens $C_1$. In addition, the intensity of the stray light is reduced to increase the exactitude in measurement by saving boundary faces between glass and air in the path of the rays of the lens tester. Furthermore, a better efficiency of the light beams is obtained with the present invention owing to the simplified optical structure. The most important advantage of the lens tester according to the embodiment of FIGURE 1 is apparent from the fact that the lens tester is extremely compact in size.

It will be appreciated that the compactness and relatively small size of the lens tester according to the present invention is achieved by the novel combination of components comprising the tester and their relationship to each other. As a result, the lens tester according to the present invention can be placed within the image field of the objective or lens to be tested, so that different zones of the objective can be tested at the same time. This has hitherto been difficult, especially in testing a miniature objective, the diagonal of image of which is only 44 mm. for example.

In testing objectives in practice, it is necessary to judge the whole of the image field which the objective is to cover. With lens tester 10 of FIG. 1 it is possible in principle to test different points in the image field successively. Due to the compactness and of the small size and dimensions of the lens tester according to the invention, normal to the optical axis, it is also possible to accommodate a plurality of such lens testers in such a way that the test images are located in front of the micro-objectives at suitable points in the image field, so that their testing can be carried out at the same time.

Since the inventive lens tester has a relatively small width transverse of its optical axis, series of such lens testers may be positioned in side-by-side relationship to simultaneously test different zones of a single objective without encountering difficulties owing to the size of the objective.

FIGURE 6 diagrammatically illustrates a lens testing apparatus 30 containing a set of lens testers 32 constructed in accordance with the invention. In this apparatus, lens testers 32 are arranged in side-by-side parallel relationshops. As a result, objective P, for example, can be tested at the same time in its center, at two points of a central zone and at two points of a marginal zone. As shown, testers 32 are individually provided with micro-objectives indicated by the reference characters $M_1$, $M_2$ and $M_3$. The micro-objective $M_1$ is positioned for testing the center of objective P, micro-objective $M_2$ is positioned for testing a point in a central zone, and micro-objective $M_3$ is positioned for testing a point in the marginal zone. Two further lens testers of the same structure may be arranged in a manner not shown, normally to the three lens testers 32, above objective $M_1$ and parallel to the optical axis of the same. Of these two latter lens testers, one serves for measuring a further point in the central zone, and the other for measuring a further point in the marginal zone. In this case the strips of the test are situated either tangentially or sagittally in the image field.

It may be added that portions of the lens tester 10 illustrated in FIGS. 1 and 1a, namely from lamp L to the micro-objective M, can be used as one channel, while a plurality of such channels may be used for testing the same lens P, inserted between these channels and the autocollimation plate A.

In the schematic view of FIG. 6, the focal plane is indicated by a broken line. The angles issuing from this line indicate the divergence of the beams issuing from the test images which are denoted T' in FIG. 1.

For testing defects of warpage, i.e. for testing whether or not one side of the image field projects a blurred image, it may be necessary to turn the objective to be tested round its axis during measuring.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed and desired to be secured by Letters Patent is:

1. An apparatus for testing the quality of lenses, comprising, in combination: at least one optical in-line arrangement, positioned in the order recited, of a light source, cubic beam-splitter means, a micro-objective, a single lens to be tested, and single retroreflecting means; a planar reticle in said beam-splitter means consisting of an array of transparent areas and reflecting areas, said transparent areas letting pass a portion of the light incident from said retroreflecting means in a first beam direction, while said reflecting areas throw back another portion of said incident light in a second beam direction; said beam-splitter deflecting said first and second beams at different angles out of said in-line arrangement; first and second photo-electric cell means responsive to said first and said second beams respectively; and first and second optical means for leading said first and said second beams from said beam-splitter means to said first and said second photo-electric cell means respectively.

2. A lens testing apparatus according to claim 1, further comprising diaphragm means between said light source and said beam-splitter means; the latter being composed of two substantially isosceles rectangular prisms, one prism being cemented with its hypotenuse to the cathetus of the other prism, the interface of said prisms being semi-transparent; said reticle being applied to substantially half of the hypotenuse of said other prism, the axis of said in-line arrangement passing through said interface and through said reticle; said first beam comprising a path from said transparent areas to said interface and thence to the free cathetus of said other prism, while said second beam comprises a path from said reflecting areas out of said in-line arrangement; said reflecting areas also throwing back a portion of the light incident from said diaphragm means in a third beam direction comprising a path from said reflecting areas to said interface and thence to said free cathetus of the other prism; said first, said second and said third beams differing from each other and from said axis only by small angles.

3. A lens testing apparatus according to claim 2, wherein said beam-splitter means further comprises first, second and third lenses cemented to said prisms, the first lens to the cathetus of said one prism facing said diaphragm means, the second lens to said half of the hypotenuse of the other prism which carries said reticle and faces said micro-objective, and the third lens to the other half of said hypotenuse of the other prism; said first and second lenses together forming an image of said diaphragm means in the pupil of said micro-objective; said first beam being formed into an image by said first and said third lenses, said second beam being formed into an image of said second lens passed twice, and said third beam being formed into an image by said second and said third lenses.

4. A lens testing apparatus according to claim 2, further comprising third photo-electric cell means responsive to said third beam, and third optical means for leading said third beam from said third lens to said third photo-electric cell means.

5. A lens testing apparatus according to claim 2, wherein at least two substantially parallel in-line arrangements are provided in a composite apparatus for simultaneously determining the image-forming qualities of said single lens at respective different points of the field of view of said lens.

References Cited

UNITED STATES PATENTS

| | | | |
|---|---|---|---|
| 1,309,359 | 7/1919 | Kellner | 88—56 |
| 2,254,548 | 9/1941 | Ruhle et al. | 88—56 |
| 2,256,595 | 9/1941 | Metcalf. | |
| 2,324,304 | 7/1943 | Katzman | 88—14 |
| 2,478,609 | 8/1949 | Townsley | 88—56 |
| 2,818,775 | 1/1958 | Ullrich | 88—56 |
| 3,017,515 | 1/1962 | Welch. | |

FOREIGN PATENTS 719,700   12/1954   Great Britain.

JEWELL H. PEDERSEN, *Primary Examiner.*

C. E. QUARTON, *Assistant Examiner.*